United States Patent
Horiguchi

Patent Number: 5,806,009
Date of Patent: *Sep. 8, 1998

[54] SHIFT CONTROL APPARATUS AND METHOD FOR AUTOMATIC TRANSMISSION OF VEHICLE

[75] Inventor: Masanobu Horiguchi, Atsugi, Japan

[73] Assignee: Unisia Jecs Corporation, Kanagawa-ken, Japan

[*] Notice: The term of this patent shall not extend beyond the expiration date of Pat. No. 5,672,139.

[21] Appl. No.: 676,604

[22] Filed: Jul. 3, 1996

[30] Foreign Application Priority Data

Jul. 5, 1995 [JP] Japan ................ 7-169857

[51] Int. Cl.$^6$ .......................... G06G 7/70; F16H 59/48
[52] U.S. Cl. .................. 701/58; 701/51; 701/64; 701/75; 477/120; 477/902
[58] Field of Search ................ 701/1, 51, 64, 701/93, 95, 101, 110, 58, 65, 94; 477/120, 211, 902, 903, 904, 121, 129; 123/349, 351, 352; 180/179, 170, 197, 282

[56] References Cited

U.S. PATENT DOCUMENTS

| | | | |
|---|---|---|---|
| 4,338,666 | 7/1982 | Suzuki et al. | 701/56 |
| 4,625,590 | 12/1986 | Muller | 701/58 |
| 4,833,612 | 5/1989 | Okuno et al. | 701/93 |
| 4,870,584 | 9/1989 | Etoh et al. | 701/95 |
| 4,939,657 | 7/1990 | Imai et al. | 701/95 |
| 4,984,545 | 1/1991 | Kaneyasu et al. | 701/93 |
| 5,048,631 | 9/1991 | Etoh | 701/94 |
| 5,253,172 | 10/1993 | Ito et al. | 701/41 |
| 5,465,208 | 11/1995 | Mochizuki et al. | 701/70 |
| 5,672,139 | 9/1997 | Horiguchi | 477/120 |

FOREIGN PATENT DOCUMENTS 1-55346  11/1989  Japan.

Primary Examiner—Jacques H. Louis-Jacques
Attorney, Agent, or Firm—McDermott, Will & Emery

[57] ABSTRACT

A shift position is controlled so that a vehicle driving force becomes larger than a corrected vehicle running resistance obtained by adding a correction value corresponding to a surplus driving force to an original running resistance. When the automatic speed control device is operative to drive the vehicle at a constant speed, the correction value is switched to a smaller value compared with when the same is inoperative so that the upshift easily occurs during the constant speed drive.

14 Claims, 6 Drawing Sheets

SHIFT CONTROL APPARATUS AND METHOD FOR AUTOMATIC TRANSMISSION OF VEHICLE

FIELD OF THE INVENTION

The present invention relates to a shift control apparatus and method for automatic transmission of a vehicle, particularly to a shift control technology for a vehicle having an automatic speed control device.

RELATED ART OF THE INVENTION

A shift control for an automatic transmission of a vehicle is generally carried out in such a manner that a shift position is selected in conformity with a shift schedule previously set depending on a relationship between an opening degree of a throttle valve (depression degree of accelerator pedal) and a vehicle speed.

However, change in the running resistance caused by the variation of a road inclination is not taken into consideration in the above method for selecting a shift position, there are problems in that, for example, if an accelerator pedal is released from a foot at a road corner in an ascending slope, an unnecessary upshift is carried out, while a highest shift position is selected in a descending slope to unwillingly disable the effect of the engine brake.

To solve such problems, a shift control apparatus is proposed, wherein the driving force which is obtained when a gear shift is carried out is presumably calculated and, if the calculated value is equal to or less than a running resistance, such a shift is inhibited so that an unnecessary upshift is prevented (see Japanese Examined Patent Publication No. 1-55346).

In this regard, the running resistance W to be compared with the above driving force is set as a value obtained by adding a predetermined value $\Delta W$ to an actual running resistance Wist by the following equation for the purpose of guaranteeing a surplus driving force after the gear shift:

$$W = Wist + \Delta W.$$

In a vehicle having an automatic speed control device for automatically controlling an opening degree of a throttle valve (engine output) so that the actual vehicle speed coincides with a target speed, the demand for the surplus driving force is, in general, relatively low when the automatic speed control device is operative to drive the vehicle at a constant speed, compared with when the same is inoperative.

That is, while frequent shifts should be avoided from occurring when the vehicle is driven at a constant speed by the assistance of the automatic speed control device, the surplus driving force may be sufficiently small because there is no need of rapid acceleration or the like, and rather lowered as low as possible so that the highest shift position is positively selected for the purpose of the improvement in fuel consumption and the reduction of noise and vibration.

However, according to the prior art shift control based on the running resistance, the value $\Delta W$ to be added to the actual running resistance Wist for the purpose of guaranteeing the surplus driving force is not variable in accordance with whether the automatic speed control device is operative or inoperative, but set to be a value corresponding to one when the automatic speed control device is inoperative.

Accordingly, even if it is sufficiently possible to drive the vehicle at a constant speed after the upshift when the automatic speed control device is operative, the upshift might be inhibited if a relatively large surplus driving force required when the automatic speed control device is inoperative is not guaranteed. Thereby, a relatively low speed side shift position is selected when the automatic speed control device is operative, and thus there is a risk that the engine is driven at an unnecessarily high speed to worsen the fuel consumption and increase the vehicle noise and vibration.

SUMMARY OF THE INVENTION

An object of the present invention is to solve the above problems by providing a shift control apparatus and method wherein the shift control is properly carried out in accordance with the variation in the running resistance depending on whether the automatic speed control device is operative or inoperative.

Another object is to provide a shift control apparatus and method wherein a high shift position is positively selected when the automatic speed control device is operative, while a necessary surplus driving force is guaranteed when the automatic speed control device is inoperative.

To achieve the above objects, a shift control apparatus and method of the present invention is adapted to calculate a correction value corresponding to a surplus driving force relative to a running resistance of a vehicle, which value is added to the running resistance to correct the latter, and to determine a shift position by comparing the corrected running resistance with a vehicle driving force, wherein the correction value is switched to one of different values in accordance with whether the automatic speed control device is operative or inoperative.

In other words, since the demand for the surplus driving force is different in accordance with whether the automatic speed control device is operative or inoperative to drive the vehicle at a constant speed, it is possible to guarantee the surplus driving forces necessary and sufficient for the operative and inoperative states, respectively, of the automatic speed control device by switching the correction value in accordance with such a difference between demands for the surplus driving force.

In this regard, the correction value is preferably switched to a smaller value when the automatic speed control device is operative than one when the same is inoperative.

Generally speaking, when the vehicle is driven at a constant speed by the operation of the automatic speed control device, the demand for the surplus driving force is lower than one when the same is inoperative, whereby it is possible to carry out the shift satisfying such a demand by selecting a smaller correction value in the operative state than that in the inoperative state.

Preferably, the shift position is selected based on the corrected running resistance and the driving force so that the driving force becomes larger than the corrected running resistance.

According to the above structure, it is possible to control the shift position capable of guaranteeing the surplus driving force and thus to avoid the unnecessary upshift or others. If the correction value is switched to a smaller value when the automatic speed control device is operative, it is possible to select a higher speed side shift position than one when the automatic speed control device is inoperative.

The present invention is preferably structured so that, when a demand for the upshift arises in accordance with a regular shift schedule previously set depending on the vehicle speed and the throttle valve opening degree, a driving force is calculated, which is obtained when the shift is carried out in accordance with the upshift demand. If the driving force thus calculated is smaller than the running resistance corrected by the correction value switched in accordance with whether the automatic speed control device is operative or inoperative, the shift satisfying the upshift demand is inhibited.

According to such a structure, even if the upshift demanding condition is reached by the regular shift schedule by releasing the accelerator pedal from the driver's foot when approaching a corner in the ascending slope, the upshift is inhibited if the driving force to be obtained at the upshift position is smaller than the running resistance to which the surplus driving force value is added, so that the current shift position is maintained and the unnecessary upshift is inhibited.

In this regard, the driving force to be obtained at a possible maximum throttle valve opening degree by which a shift position is selected in the above shift schedule is preferably calculated as a driving force when shifted at the current vehicle speed in accordance with the above-mentioned upshift demand.

According to such a structure, in a case that the upshift is permitted, it is determined whether or not the required surplus driving force is guaranteed if the driver operates the throttle valve to open after the upshift is carried out, and thus the upshift is prevented from being unnecessarily suppressed, while the surplus driving force is guaranteed.

Also, a vehicle driving force may be calculated based on a gear ratio and a turbine torque calculated based on a opening degree of a throttle valve and a rotational speed of a turbine.

The rotational speed of the turbine may be directly detected by a turbine rotation sensor or presumed based on a speed ratio between the engine rotational speed and a torque converter.

On the other hand, the running resistance of the vehicle can be calculated based on a driving force obtained at the current shift position, an acceleration resistance, and a rolling and air resistance of the vehicle.

That is, the running resistance of the vehicle includes the rolling and air resistance, acceleration resistance, slope resistance or others, and therefore, for example, the slope resistance can be presumed by subtracting the rolling and air resistance and acceleration resistance from the vehicle driving force. Thus, the shift position can be controlled to that a driving force corresponding to this slope resistance is guaranteed.

Other objects and features of the present invention will be more apparent from the following description of the preferred embodiment with reference to the attached drawings.

PREFERRED EMBODIMENT

Figure 1:
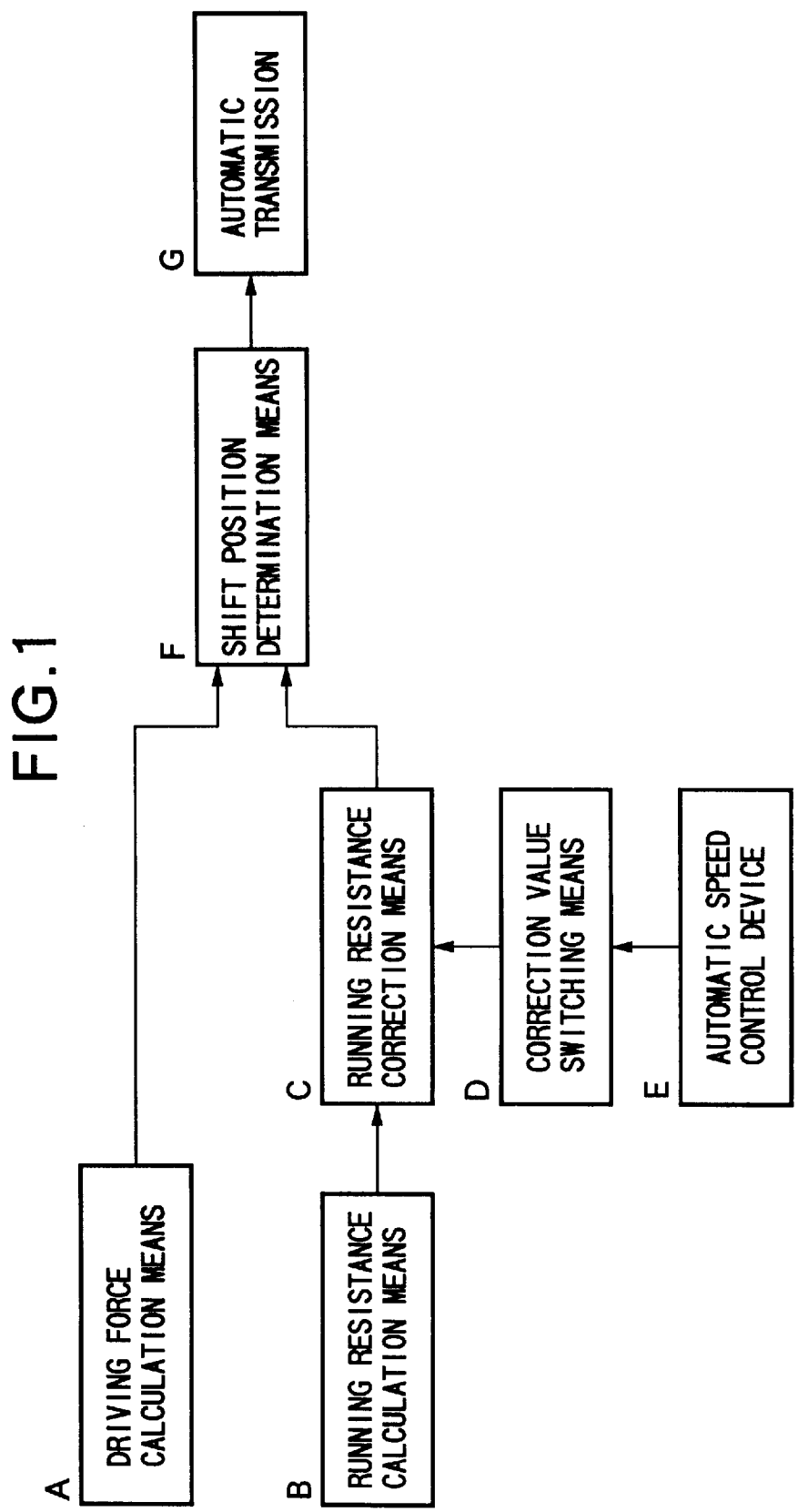
FIG. 1 is a functional block diagram showing a basic structure of a shift control apparatus defined by claim 1.

FIG. 1 is a block diagram showing a basic structure of a shift control apparatus for an automatic transmission of vehicle according to the present invention.

In FIG. 1, a driving force calculation means A calculates a vehicle driving force, and a running resistance calculation means B calculates a vehicle running resistance.

The running resistance calculated by the running resistance calculation means B is supplied to a running resistance correction means C wherein a correction value is added thereto. The correction value is switchingly selected to one of different values by a correction value switching means D in accordance with whether an automatic speed control device E is operative or inoperative.

The running resistance corrected by the running resistance correction means C and the driving force calculated by the driving force calculation means A are supplied to a shift position determination means F wherein the running resistance is compared with the driving force to determine a shift position in an automatic transmission G.

One embodiment of the shift control apparatus and method based on the above basic structure will be described below.

Figure 2:
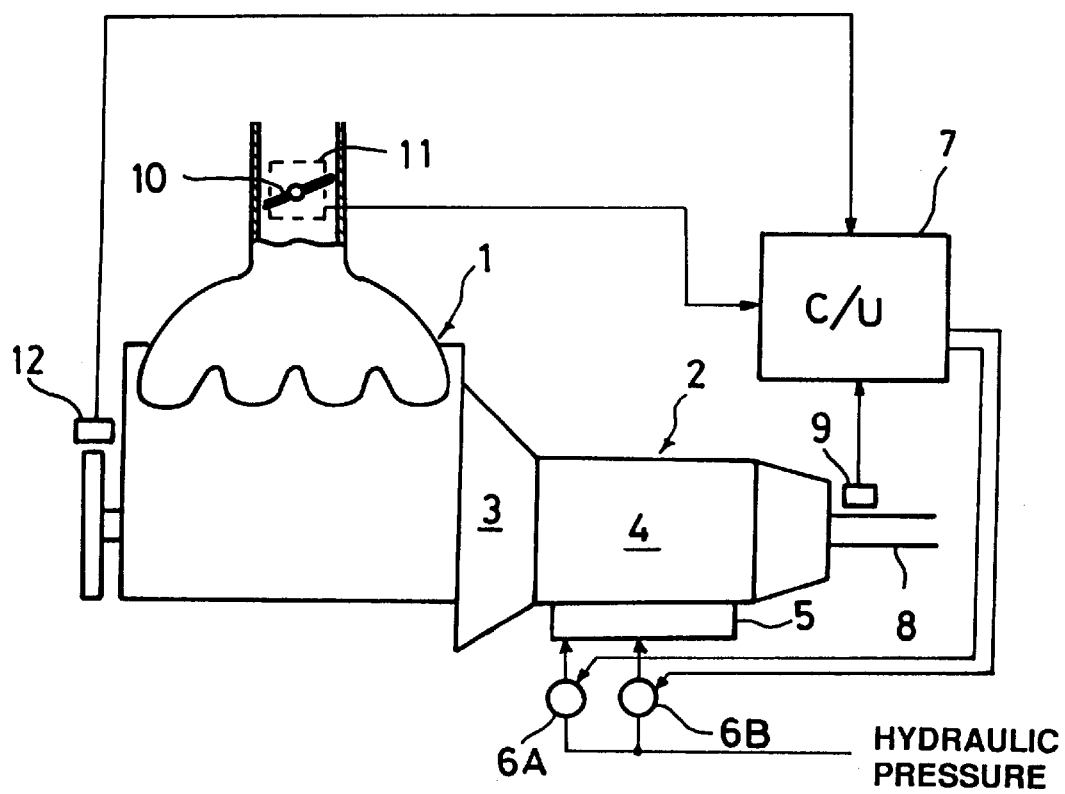
FIG. 2 is a schematic illustration of a system according to one embodiment of the present invention.

With reference to FIG. 2 schematically illustrating a system of the embodiment, an automatic transmission 2 is coupled to an output of an engine 1.

The automatic transmission 2 has a torque converter 3 coupled to the output of the engine 1, a gear type transmission mechanism 4 coupled to the torque converter 3 and a hydraulic actuator 5 for carrying out the coupling/decoupling operation of various speed changing elements in the gear type transmission mechanism 4. A hydraulic pressure supplied to the hydraulic actuator 5 is controlled in an ON/OFF manner via various solenoid valves. In this regard, only two solenoid valves 6A, 6B for an automatic shift operation are illustrated in the drawing.

Signals from various sensors are supplied to a control unit 7.

The sensors includes a vehicle speed sensor 9 for detecting a vehicle speed (rotational speed of output shaft) VSP by obtaining a rotation signal from an output shaft 8 of the automatic transmission 2.

A throttle sensor 11 of a potentiometer type is also provided in an intake system of the engine 1, for detecting an opening degree TVO of a throttle valve 10 opening and closing in association with an accelerator pedal.

A crank angle sensor 12 is provided on a crank shaft of the engine 1 or another shaft rotating in synchronism therewith (for example, a cam shaft). A signal from the crank angle sensor 12 is a reference pulse signal for each reference crank angle or a unit pulse signal issued at every unit angle, and an engine rotational speed Ne (rpm) is calculated based on these pulse signals.

The control unit 7 has a microcomputer therein and carries out the shift control in accordance with signals issued from the above-mentioned various sensor.

The vehicle used in this embodiment has an automatic speed control device for controlling an engine output so that an actual vehicle speed coincides with a target vehicle speed optionally set by the driver within a predetermined range, and ON/OFF signals for representing the states of a main switch 13 of the automatic speed control device are also supplied to the control unit 7.

The automatic speed control device is adapted to rotate an accelerator drum by a wire for the automatic speed control provided separately from an accelerator wire, and by operating the automatic speed control wire via an actuator, the throttle valve opening degree is controlled in a feedback manner so that the actual vehicle speed coincides with the target vehicle speed.

The control unit 7 carries out the shift control operation wherein one of shift positions, a first position through a fourth position, is automatically selected in accordance with a shift control routine described later, and the gear type transmission mechanism 4 is shifted to the set shift position via the hydraulic actuator 5 by controlling the combination of ON/OFF positions of the magnetic valves 6A, 6B for an automatic shift operation.

Figure 3:
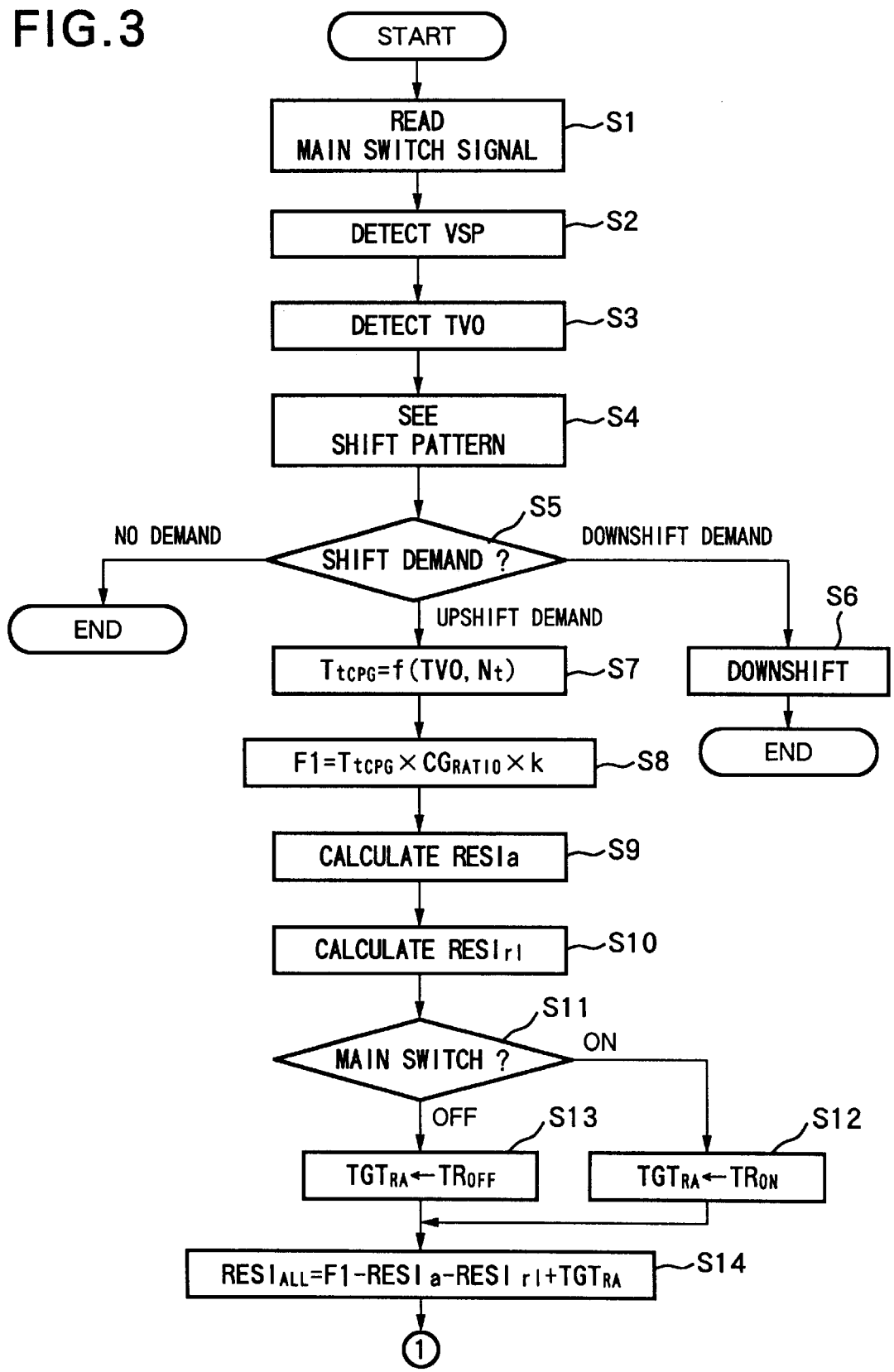
FIG. 3 is a flow chart illustrating a first half of a shift control routine of the embodiment.
Figure 4:
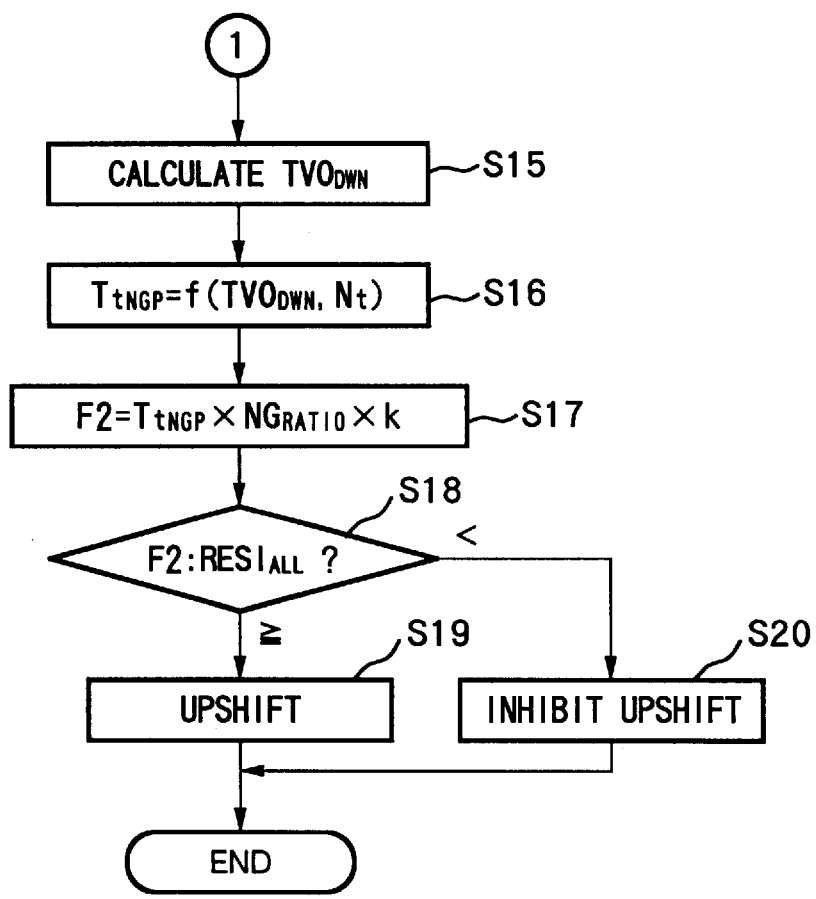
FIG. 4 is a flow chart illustrating a second half of a shift control routine of the embodiment.

Next, the shift control routine shown in the flow chart in FIGS. 3 and 4 will be explained. The routine is carried out at every predetermined time.

At step 1 (shown by S1 in the drawing; similar expressions will be used hereinafter), an ON or OFF state of the main switch 13 in the automatic speed control device is read.

At step 2, the vehicle speed VSP is detected based on a signal from the vehicle speed sensor 9.

At step 3, the throttle valve opening degree TVO (depression degree of accelerator pedal) is detected based on a signal based on a signal from the throttle sensor 11.

Figure 5:
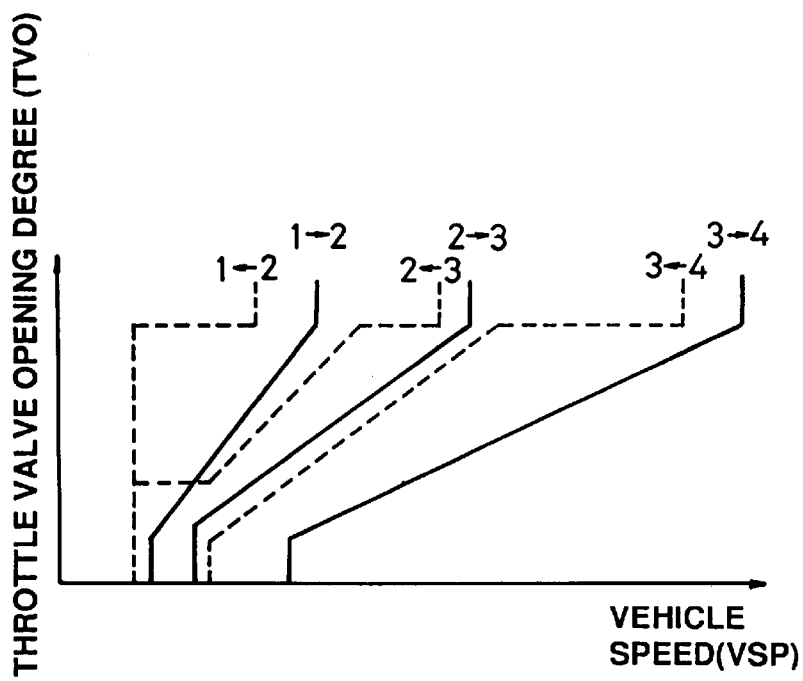
FIG. 5 is a diagram illustrating shift patterns (regular shift schedule)

At step 4, the shift position is selected with reference to a shift position map (regular shift schedule) wherein shift positions are previously set in accordance with the vehicle speed VSP and the throttle valve opening degree TVO as shown in FIG. 5 (regular shift control means). In FIG. 5, a solid line represents an upshift line showing an upshift characteristic, and a dotted line represents a downshift line showing a downshift characteristic.

At step 5, it is determined whether there is an upshift demand, a downshift demand or no shift demand based on the comparison between the selected shift position and the current shift position.

If it is determined that there is neither of the upshift demand nor the downshift demand at step 5, the routine is finished at this step, and alternatively, if it is determined that there is the downshift demand, the routine advances to step 6 at which the downshift is carried out and then the routine is finished.

If there is the upshift demand, the routine advances to step 7 for determining whether or not the upshift is proper.

In this regard, for example, when the current shift position is a third position and the shift position selected from the shift map is a fourth position, the fourth position is, of course, a shift position after the upshift, and, based on the correlation between the running resistance and the driving force, the determination is made on whether or not the upshift to the fourth position should be actually carried out. However, when the current shift position is a second position and the shift position selected from the shift map is a fourth position, a third position is temporarily selected as the upshift position and the determination is first made on whether or not the upshift to the third position is possible, and if the answer is affirmative, then a fourth position is selected as the upshift position and the determination is again made on whether or not the upshift to the fourth position is possible.

Figure 6:
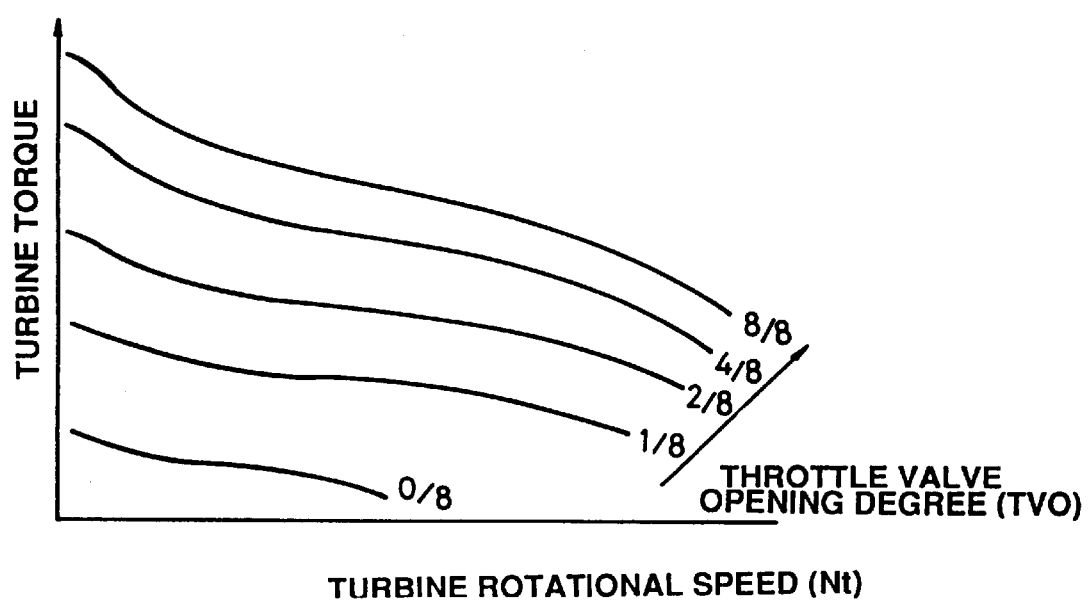
FIG. 6 is a map for calculating a turbine torque.

At step 7, a turbine torque $Tt_{CGP}$ is calculated based on the relationship between the current throttle valve opening degree TVO and the turbine rotational speed Nt (rpm) with reference to a map shown in FIG. 6 (turbine torque calculation means). While the turbine rotational speed Nt may be directly detected by a turbine sensor, it is also calculated from the engine rotational speed Ne and the torque converter characteristic (speed ratio).

At step 8, a driving force F1 at the current shift position is calculated by the following equation based on the calculated turbine torque $Tt_{CGP}$ (means for calculating a driving force derived from a turbine torque):

$$F1 = Tt_{CGP} \times CG_{RATIO} \times k$$

wherein $CG_{RATIO}$ is a gear ratio at the current shift position (third position) and k is a constant determined in accordance with a radius of a tire or others.

The above steps 7 and 8 correspond to the driving force calculation means for calculating the running resistance.

At step 9, an acceleration resistance $RESI_a$, is calculated by the following equation (acceleration resistance calculation means):

$$RESI_a = \Delta VSP \times W \times K$$

wherein $\Delta VSP$ is a variation in the vehicle speed, W is a vehicle weight, and K is a constant.

Figure 7:
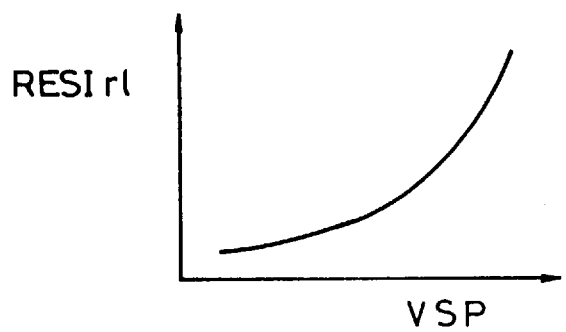
FIG. 7 is a map for calculating a rolling resistance plus an air resistance.

At step 10, a rolling resistance plus an air resistance $RESI_{rl}$ is calculated from the vehicle speed VSP with reference to a map shown in FIG. 7 (rolling and air resistance calculation means).

At step 11, it is determined whether the main switch 13 of the automatic speed control device is ON or OFF.

When the main switch 13 is ON wherein the automatic speed control device is operative, the routine advances to step 12 at which $TR_{ON}$ previously set as a correction value when the automatic speed control device is operative is set to a correction value $TGT_{RA}$. On the other hand, when the main switch 13 is OFF wherein the automatic speed control device is inoperative, the routine advances to step 13 at which $TR_{OFF}$ ($>TR_{ON}$) previously set as a correction value when the automatic speed control device is inoperative is set to $TGT_{RA}$.

In this regard, while $TR_{ON}$ is previously set as a smaller value than $TR_{OFF}$, both the values may be fixed values, respectively, or alternatively variable in accordance with the driving conditions such as a vehicle speed, provided the above magnitude relationship is maintained.

Steps 11 through 13 correspond to a correction value switching means.

At step 14, an actual running resistance is obtained by subtracting the acceleration resistance $RESI_a$ and the rolling resistance+the air resistance $RESI_{rl}$ from the current driving force F1 (running resistance calculation means), and the correction value $TGT_{RA}$ (a threshold value for a running resistance) is added thereto (running resistance correction means) to result in a running resistance $RESI_{ALL}$ to be used for the final determination of the shift position, as shown in the following equation:

$$RESI_{ALL} = (F1 - RESI_a - RESI_{rl}) + TGT_{RA}$$

As described later, since the upshift to a shift position is inhibited, at which the driving force is smaller than the running resistance $RESI_{ALL}$, the correction value $TGT_{RA}$ corresponds to a surplus driving force.

Since the correction value $TGT_{RA}$ is set to a smaller value when the automatic speed control device is operative compared with when it is inoperative, in the operative state (automatic constant speed drive state), a condition wherein the upshift is easily allowable is established; i.e., a higher shift position tends to be selected. On the contrary, in the inoperative state, a condition wherein the upshift is liable to be inhibited is established. This corresponds to a fact that the demand for the surplus driving force is lower when the automatic speed control device is operative than when the same is inoperative.

At step 15, the throttle valve opening degree TVO is determined at the current vehicle speed and set to $TVO_{DWN}$, at which opening degree, even if the upshift to the next higher position is carried out in accordance with the upshift demand, the upshift position is immediately downshifted to the current shift position, with reference to a shift pattern diagram between the vehicle speed and the throttle valve opening degree (see FIG. 5).

Figure 8:
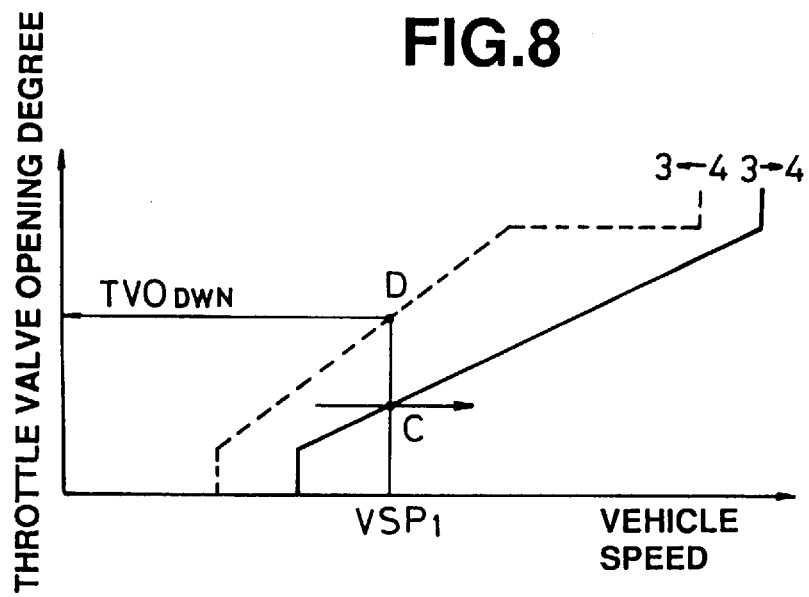
FIG. 8 is a illustration for explaining the calculation of an opening degree of a throttle valve for the purpose of obtaining a driving force after the shift has been completed.

That is, as shown in FIG. 8, for example, when the current shift position is a third position, the throttle valve opening degree $TVO_{DWN}$ is determined at point D on the downshift line from a fourth position to a third position at the vehicle speed VSP1, which is equal to the speed at point C at which the upshift demand from a third position to a fourth position occurs. If it is assumed that the vehicle speed is constant, even if the operation for opening the throttle valve is carried out after a shift position has been upshifted to a fourth position, the downshift does not occur and the fourth position is maintained until the throttle valve opening degree reaches $TVO_{DWN}$. Thus, a maximum driving force is obtained at the maximum opening degree $TVO_{DWN}$ when the upshift is carried out.

At step 16, a turbine torque $Tt_{NGP}$ is calculated based on the throttle valve opening degree $TVO_{DWN}$ at which the maximum driving force is obtainable at the upshift position and at the current turbine rotational speed Nt with reference to a map shown in FIG. 6 (turbine torque calculation means).

At step 17, a maximum driving force F2 at the upshift position is calculated based on the calculated turbine torque $Tt_{NGP}$ by the following equation (means for calculating a driving force derived from a turbine torque):

$$F2 = Tt_{NGP} \times NG_{RATIO} \times k$$

wherein $NG_{RATIO}$ is a gear ratio after the upshift, k is a constant determined by a radius of a tire or others, and the driving force F2 is a presumed value at the upshift position determined in accordance with a shift map while keeping the vehicle speed constant.

The above steps 16 and 17 correspond to a driving force calculation means for presuming the driving force when the shift is carried out in accordance with the upshift demand.

At step 18, the maximum driving force F2 at the upshift position is compared with the running resistance $RESI_{ALL}$.

If the comparison result is $F2 \geq RESI_{ALL}$, which means that the surplus driving force determined in accordance with the operative or inoperative state of the automatic speed control device is guaranteed when the upshift is carried out, the routine advances to step 19 at which the upshift is carried out.

On the contrary, if the comparison result is $F2 < RESI_{ALL}$, which means that the surplus driving force determined in accordance with the operative or inoperative state of the automatic speed control device is not guaranteed when the upshift is carried out, the routine advances to step 20 at which the upshift is inhibited and the current shift position (third position) is maintained.

The above steps 18 through 20 correspond to a shift position determination means.

In this regard, the upshift may be inhibited by other methods than that described above; for example, a method wherein the shift position is maintained at the current shift position in preference to that selected in accordance with a shift pattern diagram (regular shift schedule), and a method wherein the upshift line in the shift pattern diagram is offset toward a higher shift position side.

As stated above, according to the present invention, it is possible to avoid, in response to the variation of the running resistance, an unnecessary upshift wherein the surplus driving force cannot be guaranteed at the upshift position, and thus to prevent the operability of the vehicle from being affected by the unnecessary upshift.

Since the correction value $TGT_{RA}$ to be added to the running resistance as a value corresponding to the surplus driving force is selectively switched to one of two values in accordance with whether the automatic speed control device is operative or inoperative, so that a smaller value is selected when the automatic speed control device is operative compared with when it is inoperative, it is possible to avoid the upshift from being unnecessarily inhibited when the vehicle is driven at a constant speed and therefore the demand for the surplus driving force is relatively low, whereby the engine is prevented, by a proper upshift, from rotating at a high speed to result in the improvement in fuel consumption, vibration and noise. On the other hand, since the upshift is more severely restricted when the automatic speed control device is inoperative so that a relatively larger surplus driving force is guaranteed, the necessary and sufficient driving performance of the vehicle is fully exhibited.

What is claimed is:

1. A shift control apparatus for an automatic transmission in a vehicle provided with an automatic speed control device for controlling an engine output so that the actual vehicle speed coincides with a target vehicle speed, comprising
   a driving force calculation means for calculating a vehicle driving force,
   a running resistance calculation means for calculating a vehicle running resistance,
   a running resistance correction means for adding to a correction value corresponding a surplus driving force to the calculated vehicle running resistance
   a correction value switching means for selectively switching the correction value to one of different values in accordance with whether the automatic speed control device is operative or inoperative, and
   a shift position determination means for determining a shift position based on the running resistance corrected by the running resistance correction means and the driving force.

2. A shift control apparatus for an automatic transmission as claimed in claim 1, wherein when the automatic speed control device is operative, the correction value switching means switches the correction value to a smaller value compared with when the same is inoperative.

3. A shift control apparatus for an automatic transmission as claimed in claim 1, wherein the shift position determination means selects a shift position at which the driving force becomes larger than the running resistance corrected by the running resistance correction means.

4. A shift control apparatus for an automatic transmission as claimed in claim 1, further comprising a regular shifting means for determining a shift position in accordance with a shift schedule previously set based on a vehicle speed and an opening degree of a throttle valve; wherein when the upshift demand arises in accordance with the shift schedule, the driving force calculation means calculates a driving force at a shift position satisfying the upshift demand, and if the calculated driving force is smaller than the running resistance corrected by the running resistance correction means, the shift position determination means inhibits the shift to be carried out in response to the upshift demand.

5. A shift control apparatus for an automatic transmission as claimed in claim 4, wherein the driving force calculation means calculates, as a presumed driving force to be obtained if the shift is carried out for satisfying the upshift demand, a driving force at the current vehicle speed and at a possible maximum throttle valve opening degree at which a shift position satisfying the upshift demand is selected in accordance with the shift schedule.

6. A shift control apparatus for an automatic transmission as claimed in claim 1, wherein the driving force calculation means comprises a turbine torque calculation means for calculating a turbine torque based on a throttle valve opening degree and a turbine rotational speed, and a turbine-derived driving force calculation means for calculating the driving force based on the calculated turbine torque and a gear ratio.

7. A shift control apparatus for an automatic transmission as claimed in claim 1, wherein the running resistance calculation means comprises an acceleration resistance calculation means for calculating an acceleration resistance, and a rolling and air resistance calculation means for calculating a rolling and air resistance, wherein the running resistance is calculated based on the driving force at the current shift position calculated by the driving force calculation means and the calculated acceleration resistance and the rolling and air resistance.

8. A shift control method for an automatic transmission in a vehicle provided with an automatic speed control device for controlling an engine output so that the actual vehicle speed coincides with a target vehicle speed, comprising the steps of:

calculating a vehicle running resistance and a vehicle driving force, correcting the calculated running resistance by adding thereto a correction value corresponding to a surplus driving force, which value is switchable to one of different values in accordance with whether the automatic speed control device is operative or inoperative, and comparing the corrected running resistance with the vehicle driving force to determine a shift position.

9. A shift control method for an automatic transmission as claimed in claim 8, wherein when the automatic speed control device is operative, the correction value is switched to a smaller value compared with when the same is inoperative.

10. A shift control method for an automatic transmission as claimed in claim 8, wherein a shift position at which the driving force becomes larger than the running resistance is selected.

11. A shift control method for an automatic transmission as claimed in claim 8, wherein when an upshift demand arises in accordance with a regular shift schedule previously set based on a vehicle speed and a throttle valve opening degree, a driving force is calculated at a shift position satisfying the upshift demand, and if the calculated driving force is smaller than the corrected running resistance, the shift for satisfying the upshift demand is inhibited.

12. A shift control method for an automatic transmission as claimed in claim 11, wherein as a presumed driving force to be obtained if the shift is carried out for satisfying the upshift demand, a driving force is calculated at the current vehicle speed and at a possible maximum throttle valve opening degree at which a shift position satisfying the upshift demand is selected in accordance with the shift schedule.

13. A shift control method for an automatic transmission as claimed in claim 8, wherein a turbine torque is calculated based on a throttle valve opening degree and a turbine rotational speed, and the driving force is calculated based on the calculated turbine torque and a gear ratio.

14. A shift control method for an automatic transmission as claimed in claim 8, wherein the running resistance is calculated based on the driving force at the current shift position, an acceleration resistance and a rolling and air resistance of the vehicle.

* * * * *